UNITED STATES PATENT OFFICE.

EUDO MONTI, OF TURIN, ITALY.

PROCESS OF EXHAUSTING UNFERMENTED GRAPES OR BERRIES.

1,167,006. Specification of Letters Patent. Patented Jan. 4, 1916.

No Drawing. Application filed March 5, 1914. Serial No. 822,763.

*To all whom it may concern:*

Be it known that I, EUDO MONTI, a subject of the King of Italy, and resident of 20 via Figlie dei Militari, Turin, Italy, have invented certain new and useful Improvements in Processes of Exhausting Unfermented Grapes or Berries, of which the following is a specification.

It is a well known fact that the wines especially the finest wines derived from the choicest grapes have a much more delicate and agreeable flavor if the fermentation of said grapes has been carried on slowly at a low temperature. It is also a well known fact that in such conditions grape sugar produces a much higher percentage of pure ethyl-alcohol and a lower percentage of undesirable or poisonous by-products such as glycerin, higher alcohols, aldehydes, and the like. Unfortunately wines fermented at a low temperature are very poor in color and extracts, the tonic and astringent properties of which are requested by the great majority of the consumers. They lack that consistency and viscosity which is so much appreciated. Unfermented grape juice extracted by pressing the grapes, besides leaving in the pomace a very large percentage of grape sugar, does not possess the tonic properties and the astringent taste of the fresh grapes, because it lacks the color and extract which, remain in the pomace, adhering to the peel, and cannot be separated otherwise than by fermentation and distillation in order to obtain brandy, which is now considered a very objectionable product. It has been also ascertained by recent researches that grapes and berries owe their health-restoring properties and their value as foods to the presence of phosphated protein and phosphated oils which will curdle and separate if the juice is heated to a temperature above 55° C. and will be destroyed by fermentation.

After extensive trials and experiments I have succeeded to solve the problem of obtaining wines, very rich in flavor, color and extract, of completely exhausting the pomace and of obtaining concentrated grape juice, having the composition, taste, flavor and color of natural grapes or berries by the process herein described. I first crush the grapes or berries and separate them from the stems and afterward slightly press them and strain the juice through a sieve, cool if necessary and allow it to ferment slowly in a cool room at a temperature not exceeding 15° C. I afterward soak the pomace which still contains about half its weight of juice and almost all the color and tannic acid, in a warm room or in insulated tanks with water warmed so that after stirring the pomace it will be warmed to a temperature slightly exceeding 50° but not reaching 60° C. in order to prevent fermentation without altering the color or without curdling the albuminous matter. I then pass the extract thus obtained or the pomace into a series of tanks, warming them if necessary in order to keep an even temperature of about 50° C. in all the tanks and substituting new warm water until the pomace in the first tank is completely exhausted. I now drain the first tank and press the pomace straining the greatly diluted juice thus obtained and pass it into the next tank, while the first tank is being emptied and filled with fresh pomace, which will be soaked with the warm juice coming from the last tank but one. The pomace contained in the second tank is afterward in its turn drained and pressed, and the juice strained through the first tank while the second tank is substituted by another tank full of fresh pomace into which the juice coming from the last tank but one will be strained, and so on continually till all the fresh pomace has been exhausted. It will be seen that after once filling the whole series of tanks (generally from 6 to 8 tanks), no more water needs to be added for the whole duration of the vintage season, provided the tanks are kept sufficiently warm. The unfermented pomace in the first tank will thus be completely exhausted. On account of the property possessed by the color and extract contained in the pomace of dissolving completely in diluted lukewarm grape-juice the extract flowing in the last tank containing the fresh pomace will have exactly the same concentration after a series of operations as the fresh juice obtained by pressing the pomace, but it will be much more colored and so much richer in extract, that it is generally sufficient to add one-third of said extract to the juice separated from the grapes and slowly fermenting it in a cool room, in order to obtain a wine much more flavored and just as rich in color and extract, as the wine which I would have obtained by exhausting the grapes in the usual way. The remaining two-thirds may be used to make a concentrated pomace extract or, if added to the fermented must a greatly colored wine will be obtained from not very richly colored grapes.

I will now describe the new art of obtaining concentrated or sterilized grape juice having the flavor and the invigorating and nutritious properties of fresh grapes or berries, also the preparation of concentrated extracts of unfermented pomace. Instead of adding natural pomace extract to the fermented grape juice, I cool the pomace very quickly to about 0° C. in order to prevent fermentation and concentrate it by using either the lukewarm water vacuum apparatus or a freezing apparatus or both. I obtain thus an extract containing from 66% to 80% of sugar and other solid matters which, not having been warmed over 50° C. will contain all the soluble matters practically unaltered which were originally contained in the pomace, and will therefore intensify the grape juice if added in proper quantity to it.

In order to obtain the homogeneous extract of grapes instead of allowing the juice to separate into its constituent parts in the way above described, I cool it, filter it, and submit it to the freezing process described in my several U. S. patents, until a specific weight of about 1200 grams per liter is reached, I thereupon add a suitable quantity of concentrated pomace extract, submit it, while cool to a temperature beneath 0° C. to an oxidizing process in order to improve its flavor filter and bottle it, pasteurizing the bottles at a temperature not exceeding 55° C., which will not curdle or separate the protein or the organic phosphorus, nor destroy the enzyms, but under the circumstances will destroy all figured ferments, the practice having taught me that while a temperature of over 80° C. is necessary to sterilize natural must, the same must concentrated to a thickness of about 1200 grams per liter will keep, if warmed for about 20 minutes to a little over 50° C. but not over 55° C. The juice thus prepared will not only keep for any length of time, but will improve by aging as the sweet wines of the Sauterne type do. Of course the grape sugar contained therein will slowly hydrolyze and etherify. Concentrated grape juice thus treated will acquire such an intensity of flavor, that it is enough to add about 5% of it to sparkling wine, made from common grapes to give it the flavor of sparkling wine, made from the choicest grapes, such as are used for concentrated and etherified must.

I avoid the expense of bottling the juice already concentrated by freezing and also to pasteurize it by reconcentrating it in lukewarm water in a concentrator of the type described in my U. S. Patent 1065,829, and at a very low temperature to a specific weight of about 1380 grams. The must thus concentrated will crystallize and acquire the consistency of honey. If the temperature did not exceed 30° C. the grape thus obtained will have the taste, and contain all the invigorating nutritions and strengthgiving matter contained in natural grapes, but of course, even if the concentration has been carried on at a temperature not exceeding 15° C., some of the ethers, flavorings and other volatile compounds, will separate and therefore the must concentrated in vacuum will not have a taste and flavor quite as delicious as grape or fruit juice concentrated and oxidized by freezing process and sterilized in bottles at a temperature not exceeding 55° C.

The above described process of exhausting pomace and make grape and fruit flavorings may be applied also to the exhaustion of all kinds of drugs namely quina bark, columbus, kola, rhubarb, aloe, quajacol, bitter orange, absinthe, cocoa, tea, coffee, pepsin, peptonate of iron and the like making all kinds of medicated non-alcoholic must which may substitute the similar wines every time the use of alcohol is objected to by the practitioner. The process is exactly the same as the one I use in order to exhaust pomace, the only difference being that the sugar and acid juice not being naturally contained in said drugs, must be added, and the product concentrated sufficiently to keep, even during warm weather, that is, it should not contain more than 30 to 35% of moisture. Experience has also taught me that fresh eggs, milk, blood, meat and the like, if stirred with natural or concentrated grape or berry juice, at a temperature of about 35° to 40° C. will dissolve or digest therein and the product concentrated in a lukewarm concentrator till it contains not more than 1/3 of its weight of moisture, will keep for any length of time. The digestion will so modify the constitution of albumin that it will not curdle by heating and, though not yet peptonized, will peptonize quickly under proper conditions, while, if it had not been previously digested in must, it would take hours and a much larger quantity of pepsin to obtain the same result; also the phosphated oil and the phosphated albumin contained in eggs, the butter and the casein contained in milk thus treated, if diluted in lukewarm or even cold water, will emulsify so that they will separate but very slowly from the water, and they are in this form very easily digested in a much shorter time than it would take to peptonize the natural milk, eggs or meat. The hematin contained in blood emulsified with grape juice in the way above described, will combine with it in such form, that it will remain unaltered even if the product is boiled, and so will the albumin contained in the serum. It is therefore easy to concentrate all the organic phosphorus contained in eggs and grapes and all the organic iron contained in several times its weight of blood, into a small quantity of unaltered and soluble extract, which sterilizes without curdling, thus avoiding the objection many physicians have to the use of blood as a way of administering organic iron on account of the danger of possible infection. The extracts thus obtained are very agreeable to the taste and are very easily assimilated even by individuals who would not digest or assimilate the natural eggs, blood or meat.

I claim:—

1. A process for exhausting unfermented berries, particularly grapes, consisting in straining the juice from crushed and pressed berries; thereupon fermenting the juice at a temperature not above 15° C.; then soaking the pomace in warm water so that the mixture attains a temperature between 50° and 60° C.; adding water and maintaining said temperature until the pomace has been exhausted; then pressing the pomace and straining the liquid; then similarly soaking a fresh supply of pomace with the said liquid, still retaining the same temperature.

2. A process for exhausting unfermented berries, particularly grapes, consisting in soaking the pomace from crushed and pressed berries in warm water so that the mixture attains a temperature of between 50° and 60° C.; adding water and maintaining said temperature until the pomace has been exhausted; then pressing the pomace and straining the liquid; then similarly soaking a fresh supply of pomace with the said liquid, still retaining the same temperature; thereupon cooling the resulting juice to about 0° C. and ultimately concentrating it.

3. A process for exhausting unfermented berries, particularly grapes, consisting in soaking the pomace from crushed and pressed berries in warm water so that the mixture attains a temperature of between 50° and 60° C.; adding water and maintaining said temperature until the pomace has been exhausted; then pressing the pomace and straining the liquid; then similarly soaking a fresh supply of pomace with the said liquid, still retaining the same temperature; thereupon cooling the resulting juice to about 0° C. and ultimately concentrating it; thereby obtaining an extract containing from 66% to 80% of sugar and solid matter.

The foregoing specification signed at Turin, Italy, this 18th day of February, 1914.

EUDO MONTI.

In presence of—
    Lug. Ferruccio Jacobacci,
    C. S. Feyles.